Aug. 15, 1961     N. EMMONS III     2,995,921

GAGING APPARATUS

Filed March 6, 1959

INVENTOR

Nelson Emmons III

BY

Ernest J. Hix

ATTORNEY

2,995,921
Patented Aug. 15, 1961

2,995,921
GAGING APPARATUS
Nelson Emmons III, Dayton, Ohio, assignor to The Sheffield Corporation, Dayton, Ohio, a corporation of Delaware
Filed Mar. 6, 1959, Ser. No. 797,708
4 Claims. (Cl. 73—37.8)

This invention relates to gaging apparatus and more particularly to a gaging apparatus for measuring and comparing dimensions.

In precision assemblies, cooperating dimensions must be gaged to determine if they will fit together in proper clearance or interfitting relation. For example, both the external diameter of a pin and the internal diameter of a hole into which it is inserted must be measured and compared to determine if they will assemble properly.

The most common prior practice for such assemblies has been to establish tolerance relationships on each of the assembled components which, if satisfied, would assure that the parts or workpieces will assemble within a certain allowable variation. If it were desired to know just what this relationship would be for any two mating parts it was usually necessary to measure each and mathematically calculate the difference in dimensions. Prior known attempts at providing gaging devices for simultaneously measuring the individual dimensions and also the relationship between the gaged dimensions have involved complex and expensive systems whether they be mechanical, pneumatic or electric.

It is accordingly an object of the present invention to provide a gaging apparatus of the pneumatic type for rapidly and accurately measuring not only each of a pair of workpiece dimensions but also providing a single signal or indication determined by the relationship therebetween, in an apparatus which is simple and reliable in operation as well as inexpensive to construct.

It is a further object to provide such an apparatus including a circuit wherein a first gaging means in a single supply conduit is in series with a plurality of gaging means, one in each of a pair of branch conduits, the flows through the respective branch conduits responding equally but in a reverse sense to equal increases or decreases in the gaged dimensions, whereby the first gaging means measures the difference in dimensions and the second gaging means each measure one of the dimensions compared.

It is a further object to provide such a gaging apparatus wherein each of the gaging means includes a vertically disposed internally tapered flow tube forming a portion of the respective conduit and including an indicating float positioned therealong in accordance with flow, each of said indicating tubes having associated therewith its own setup adjustments, whereby without complex mechanical components, diaphragms, bellows or the like, the respective dimensions are independently indicated and the relationship therebetween also measured and displayed.

Figure 1:
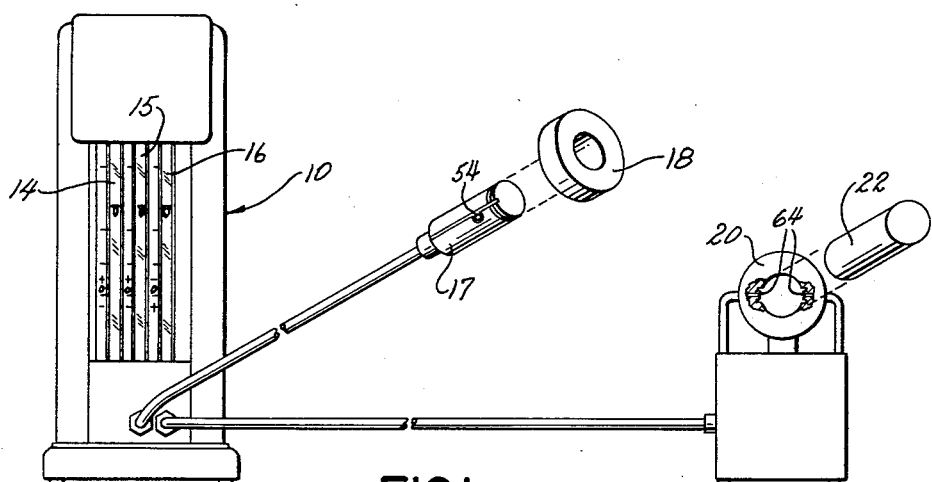
Figure 2:
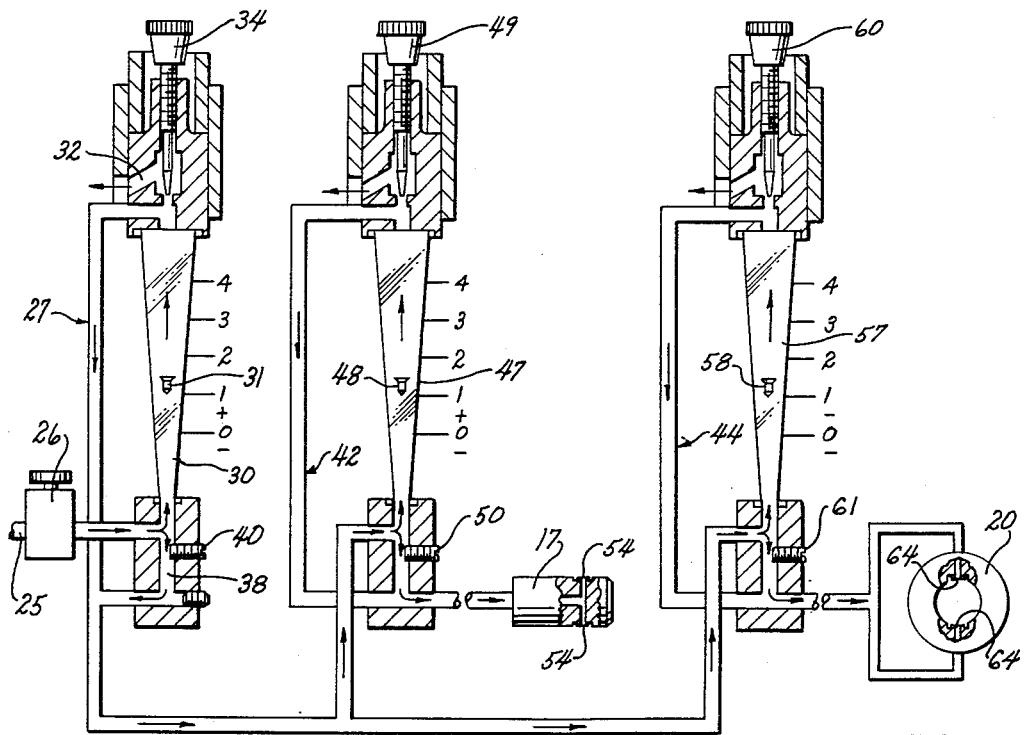

Other objects and advantages of the invention will be apparent from the following description, the appended claims, and the accompanying drawing in which, FIGURE 1 illustrates in partial perspective an exemplary gaging apparatus embodying the present invention, and FIGURE 2 is a diagrammatic view in partial section showing details of the apparatus of FIGURE 1.

In the illustrated embodiment of the present invention air flows from a common source through a regulator and supply conduit to branch conduits each terminating in a gage head including leakage orifices controlled by variations in one of the dimensions to be compared. In this instance the dimensions are the external diameter of a pin and the cooperating internal diameter of a hole in a workpiece with which the pin is assembled. A flow responsive indicating or gaging means is provided in the supply conduit. As shown, this includes a vertically disposed internally tapered flow tube having an indicating float positioned therealong in accordance with the total flow through the circuit. Similar gaging means are provided in each of the branch conduits, each in series with the first gaging means, which are independently responsive to the respective dimensions.

The flow through the respective gage heads and branch conduits responds equally but reversely to equal increases or equal decreases in the two dimensions. For example, if in the illustrated embodiment the external diameter of the pin increases it decreases flow in the corresponding branch conduit by a certain amount. The same increase in the diameter of the hole which receives the pin will result in an equal increase in flow through the respective measuring gage head and conduit. Equal changes in dimension (which would not change clearance between the workpieces) cause offsetting flow changes and total flow does not change. Thus the gaging means in the supply conduit accurately measures the difference in dimension while the other gaging means independently measure the respective dimensions.

In FIGURE 1 of the drawing is shown an instrument 10 including indicating flow tubes 14, 15 and 16 for respectively indicating the clearance between the workpieces measured, the internal dimension of the outer ring 18, and the external dimension of pin 22. Gaging spindle 17 connected to instrument 10 is provided for insertion into ring 18 while a ring 20 measures pin 22.

Air is supplied from a connection 25 leading from a compressed air source. Regulator 26 receives air from this source and maintains a stable pressure supply. A supply conduit 27 leads from regulator 26. A portion of conduit 27 is formed as an internally tapered flow tube 30. This tube includes an indicating float 31 which positions itself vertically within the tube in accordance with the velocity of flow through conduit 27 and the total flow through the circuit.

A relief opening to atmosphere is provided at 32, controlled by knob 34, to position float 31 as desired along tube 30 in setup procedures. A by-pass passage 38 is controlled by adjustment 40 to vary the amplification as desired. These adjustments are made prior to gaging.

Branch outlet conduits 42 and 44 lead from supply conduit 27. Outlet conduit 42 includes an indicating tube 47 and float 48 controlled during set-up by relief knob 49 and by-pass adjustment 50.

Conduit 42 terminates in gage head 17 previously mentioned. This gage head includes opposed leakage orifices 54 which cooperate with workpiece 18 and control exhaust to atmosphere in accordance with the workpiece diameter. Thus the flow through conduit 42 responds to the internal dimension of workpiece 18.

Similarly outlet conduit 44 has an indicating tube 57 with float 58 and relief and amplification adjustments 60, 61. Measuring ring 20 has orifices 64 which cooperate with pin 22, controlling the exhaust to atmosphere in accordance with its external diameter. Float 58 responds to this variation in flow through tube 57 to indicate the external diameter of pin 22.

Thus tubes 47 and 57 are each in series with tube 30 in the supply conduit. As previously mentioned an increase in diameter of pin 22 reduces the exhaust to atmosphere through ring 20 while an increase in diameter of the hole in workpiece 18 causes an increase in flow. An equal increase in both (same clearance relationship) does not vary the total flow or position of float 31. Unequal variations will change the total flow and float 31 will show the clearance relationship. Once adjustments of relief knobs 34, 49 and 60 have been made the relief flows do not change through the gaging range and gaging results are not affected thereby. Thus float 31 moves within tube 30 in response to the relationship between the dimensions. When the clearance between pin 22 and ring 18 increases float 31 will rise. When it decreases the float will assume a lower position, indicating directly the relation between dimensions. Floats 48 and 58 are positioned respectively within tubes 47 and 57 in accordance with the flow through conduits 42 and 44, and the separate dimensions of ring 18 and pin 22.

In the illustrated embodiment where an internal dimension is compared with an external dimension both sets of orifices are open orifices although the invention may be employed, for example, to indicate the difference in thickness of two parts that are compared to one another. This can be done by using gage heads of the character shown in Patent No. 2,831,257 (issued April 22, 1958) so arranged that as the thickness of one part increases there is an increase in flow in the respective outlet conduit and with an equal increase in thickness of the other part there is an equal decrease in flow in the other outlet conduit.

Thus it is seen that an extremely simple and reliable pneumatic gaging apparatus has been provided for directly indicating separate workpiece dimensions and displaying, without complication, the relationship therebetween. No complex mechanical devices are involved in the operation and diaphragms, bellows or other complicated pneumatic components are avoided.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. Gaging apparatus for individually gaging and for directly comparing workpiece dimensions, comprising a pressure regulator for connection to a source of air under pressure, a supply conduit connected to said regulator and leading therefrom, a pair of branch outlet conduits connected to said supply conduit, first gage head means for one of said outlet conduits including leakage means exhausting to atmosphere and controlled by a first workpiece dimension to increase flow with an increase in the respective gaged dimension, second gage head means for the other of said outlet conduits including leakage means controlled by the respective workpiece dimension for an equal decrease in flow for the same increase in the respective gaged dimension, whereby the flow through said branch conduits changes equally but in a reverse sense with the same change in the respective gaged dimensions and total flow varies with the difference between the dimensions, gaging means for independently measuring the flow in each branch conduit responsive to the respective gaged dimensions, and further gaging means for measuring the total circuit flow through said supply conduit responsive to the difference between the gaged dimensions.

2. Gaging apparatus for individually measuring and directly comparing workpiece dimensions, comprising a pressure regulator for connection to a source of air under pressure, a supply conduit connected to and leading from said regulator, a pair of branch outlet conduits connected to said supply conduit, first gage head means for one of said outlet conduits including leakage means exhausting to atmosphere controlled by a first workpiece dimension to increase flow through the respective outlet conduit with an increase in the gaged dimension, second gage head means connected to the other of said outlet conduits including leakage means exhausting to atmosphere controlled by the second of said workpiece dimensions to equally decrease flow through the respective outlet conduit with an equal increase in the respective gaged dimension, an indicating tube and float forming a part of said supply conduit responsive to total flow therethrough and the relationship between the workpiece dimension gaged, and an indicating tube and float in each of said branch outlet conduits responsive to flow through the respective gage heads and independently indicating the gaged dimensions.

3. Gaging apparatus for individually measuring and directly comparing dimensions of interfitting internal and external surfaces on cooperating workpieces comprising a pressure regulator for connection to an air pressure source, a supply conduit connected to said pressure regulator and leading therefrom, a pair of branch outlet conduits leading from said supply conduit, first gage head means connected to one of said outlet conduits including leakage means controlled by the internal workpiece surface with a certain increase in flow through the respective outlet conduit with a given increase in the internal dimension gaged, second gage head means connected to the other of said outlet conduits including leakage means controlled by the external workpiece surface with an equal change but decrease in flow through the respective outlet conduit with an equal increase in the external dimension, indicating means for each of said outlet conduits independently responsive to the flow in the respective conduits and the respective gaged dimensions, and further indicating means for said supply conduit responsive to the total flow therethrough and the relationship between the gaged internal and external dimensions.

4. Gaging apparatus for individually measuring the interfitting dimensions of a hole and an interfitting part as well as the clearance relationship therebetween, comprising a pressure regulator for connection to a source of air under pressure, a supply conduit connected to said regulator and leading therefrom, a pair of branch outlet conduits connected to said supply conduit, a gaging spindle connected to one of said outlet conduits including opposed leakage orifices disposed in opposition to said hole upon insertion of said spindle therein and controlled by the internal interfitting dimension thereof to vary flow through the respective outlet conduit, a gage head connected to the other of said outlet conduits including opposed leakage orifices receiving said interfitting part therebetween and equally but reversely controlling flow from the respective outlet conduit in accordance with the external interfitting dimension thereof, whereby the flow through the respective branch conduits is responsive to the respective gaged dimensions and the total flow is determined by the clearance relationship therebetween, an indicating tube forming a part of said supply conduit including a float movable therealong in response to the total flow for indicating the clearance between the wall of said hole and interfitting part, an indicating tube for each of said outlet conduits forming a part of the respective conduits, each of said tubes including an indicating float responsive to the flow through the respective conduit and indicating the respective measured dimension.

References Cited in the file of this patent

UNITED STATES PATENTS

| | | |
|---|---|---|
| 2,370,219 | Aller | Feb. 27, 1945 |
| 2,412,413 | Moss | Dec. 10, 1946 |
| 2,431,087 | Subber | Nov. 18, 1947 |
| 2,477,399 | Aller | July 26, 1949 |